Figure 1:
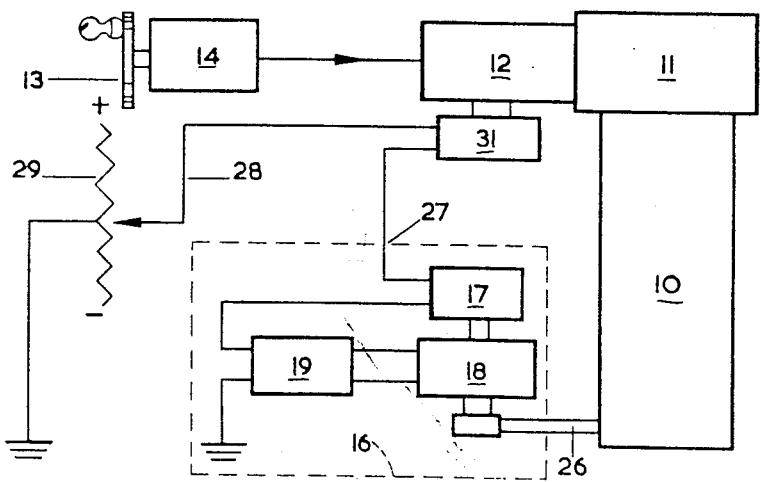

United States Patent

[11] 3,548,731

| [72] | Inventors | John Denzil Barr<br>Oadby;<br>Dexter Robert Plummer, Leicester, England |
|---|---|---|
| [21] | Appl. No. | 608,235 |
| [22] | Filed | Sept. 6, 1966 |
| [45] | Patented | Dec. 22, 1970 |
| [73] | Assignee | The Rank Organisation Limited<br>London, England<br>a company of Great Britain and Northern Ireland |
| [32] | Priority | Sept. 3, 1965 |
| [33] | | Great Britain |
| [31] | | No. 37,663/65 |

[54] CONTROL SYSTEMS
22 Claims, 16 Drawing Figs.

[52] U.S. Cl............................................. 95/45
[51] Int. Cl............................................. G03b 3/12
[50] Field of Search.................................. 350/186, 187, 255; 95/45, (Inquired); 74/(Inquired); 318/(Inquired)

[56] References Cited
UNITED STATES PATENTS

| 2,999,322 | 9/1961 | Hemstreet..................... | 350/187 |
| 3,134,298 | 5/1964 | Volkholz........................ | 350/255X |
| 3,283,231 | 11/1966 | Askew............................ | 350/187 |
| 3,296,883 | 1/1967 | Plummer........................ | 350/187 |
| 3,314,350 | 4/1967 | Husum........................... | 355/58X |
| 3,366,004 | 1/1968 | Czernek......................... | 95/45X |
| 3,399,943 | 9/1968 | Barr................................ | 95/45X |
| 3,400,212 | 9/1968 | Plummer........................ | 95/45X |
| 3,424,514 | 1/1969 | Back............................... | 95/45X |

*Primary Examiner*—John M. Horan
*Attorney*—Griffin, Branigan and Kindness

ABSTRACT: Magnification changes in a zoom lens arrangement consequent to alterations of focus setting are compensated by applying to a zoom control servo a signal derived from a focus setting mechanism so as to cause corrective changes in zoom setting in accordance with changes in focus setting. Second order compensation may be provided by modifying this signal in variable signal modifying means coupled to and set by the zoom setting mechanism.

FIG. II

CONTROL SYSTEMS

This invention is concerned with a servo-operated zoom lens arrangement, and relates particularly but not exclusively to a servo-operated zoom lens arrangement for a television camera.

Zoom lenses which are operated by a servocontrol device have been proposed in which the zoom setting is achieved by a setting a zoom rate demand unit. This operates the servocontrol motor, which in turn slider the relevant movable portion of the zoom lens into the required position. Such zoom lens arrangements have a separate focus control device, referred to a as a focus demand unit, with which the focus of the zoom lens may be controlled. It has been found that such proposed arrangements suffer from the disadvantage that when the zoom lens is in a particular position, and a change is made by the operator in the focus setting, the magnification is thereby optically changed, although no mechanical movement has taken place in the zoom linkage.

At wide angle and/or small aperture there is comparatively great depth of focus under these condition the effect of focus adjustment on the magnification can be more obvious than its effect on focus. Focussing during a slow zoom can make the zoom appear jerky.

It is an object of the present invention to overcome this drawback.

According to one aspect of the present invention there is provided a servo-operated zoom lens arrangement comprising means for providing an electrical signal for controlling the operation of servodrive means actuating the zoom mechanism of a zoom lens to compensate for alterations in apparent zoom settings of said zoom lens following alterations in the focus setting of said zoom lens.

Figure 2:
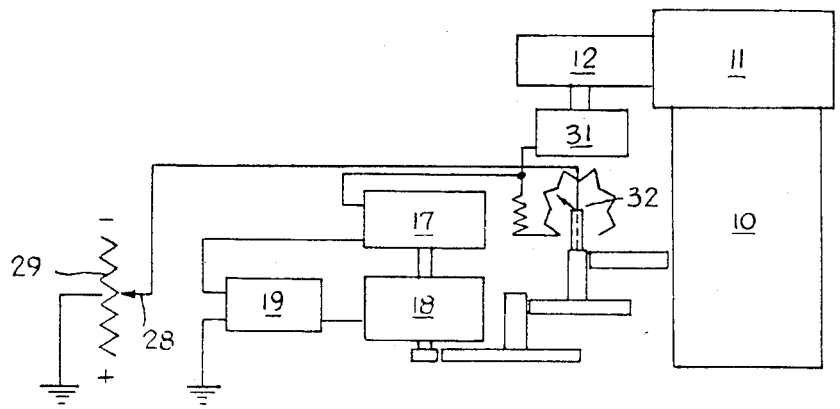
Figure 3:
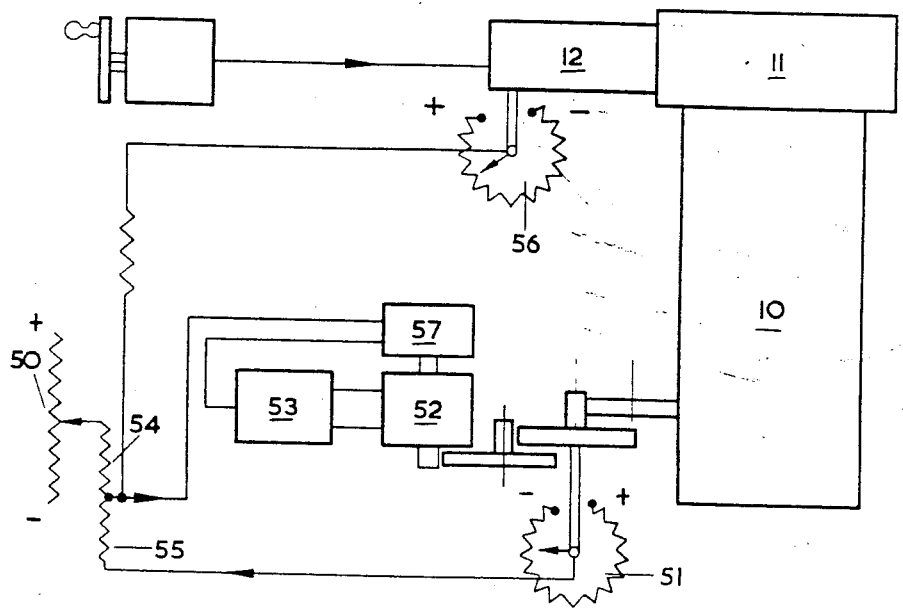
Figure 4:
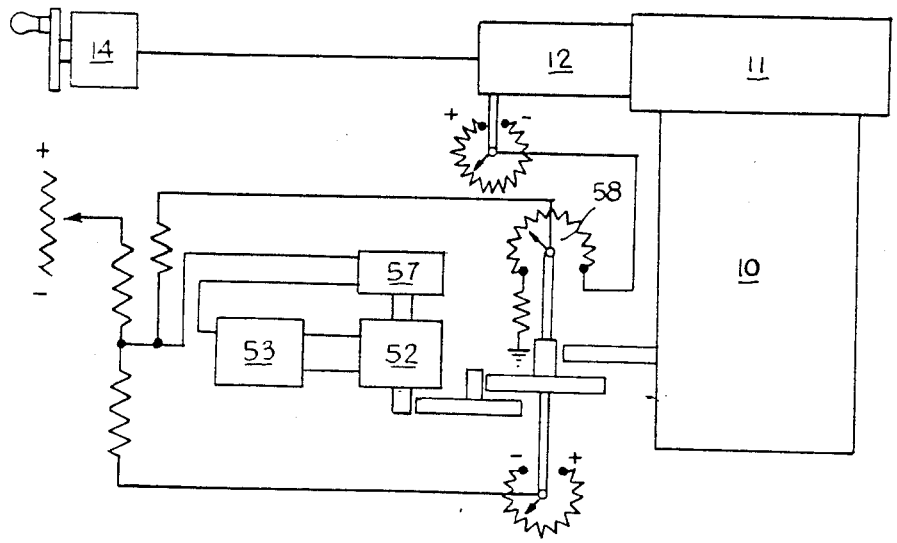
Figure 5:
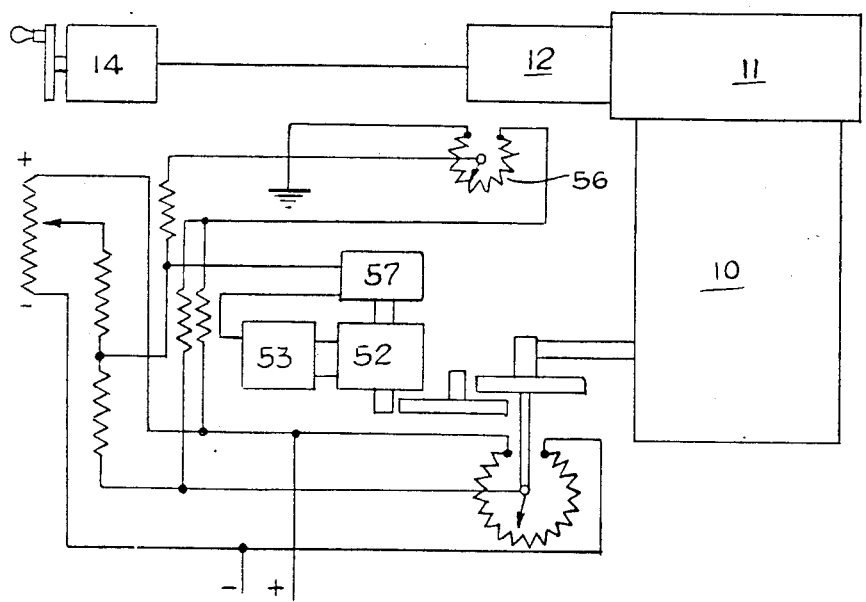
Figure 6:
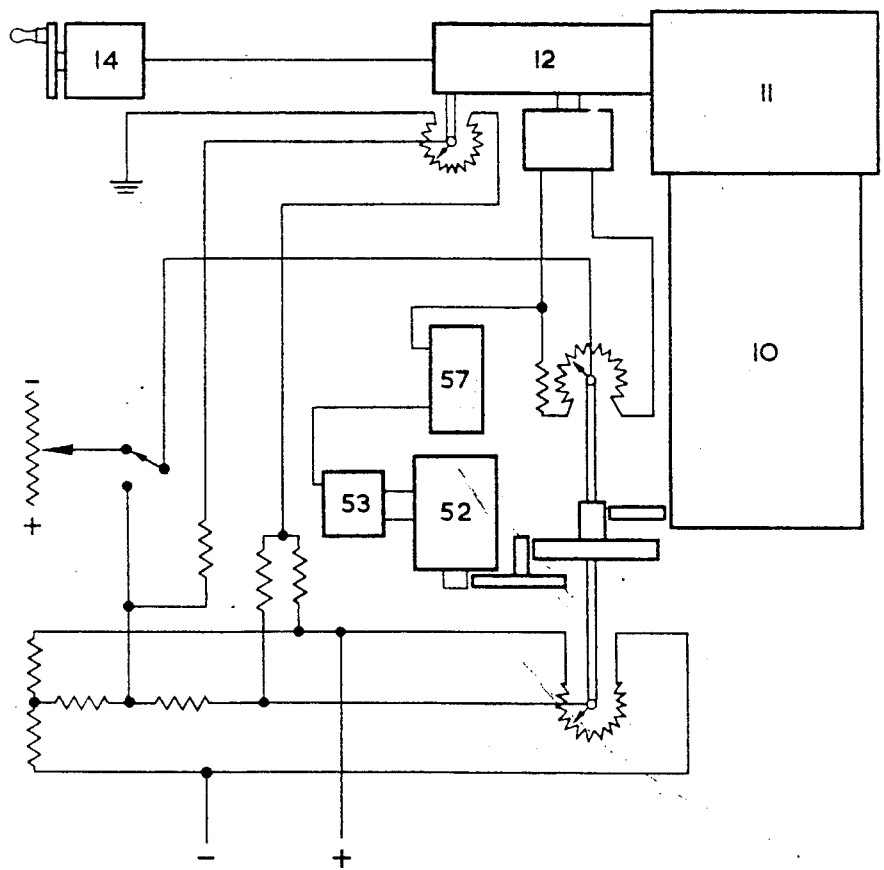

Embodiments of the servo-operated zoom lens arrangements according to the present invention will now be particularly described by way of example with reference to the accompanying drawings, in which:

FIG. 1. is a representation, in block diagram/, form of a first embodiment of the servo-operated zoom lens arrangement, providing first order compensation;

FIG. 2. is a representation, in block diagram form, of a second embodiment giving second order compensation;

FIG. 3. is a representation, in block diagram form, of a third embodiment of a servo-operated zoom lens arrangement, but with a positional control servomechanism, in which first order correction is provided;

FIG. 4. is a representation, in block diagram form, of a fourth embodiment, in respect of positional servocontrol and second order correction;

FIG. 5. is a representation, in block diagram form, of a fifth embodiment, having similar properties to the one shown in FIG 4, but with few component parts; and FIG. 6. is a representation, in block diagram form, of a sixth embodiment of a servo-operated zoom lens arrangement, in which both rate servocontrol and positional servocontrol are provided.

FIG. 7 to 16 are representations in block diagram form, alternative arrangements of the embodiments of FIGS. 1 to 6.

Referring to FIG. 1 of d the drawings, the servo-operated zoom lens arrangement of a television camera, not shown, comprises a lens portion consisting of a conventional zoom portion with its actuating mechanism 10 for causing the zoom effect of the lens and a focus portion 11, also conventional which allows the focus of the lens to be adjusted independently of the zoom setting. The focus portion 11 is actuated by a focus mechanism 12, in the normal way which is controlled by the operate operator as he turns the handwheel of a focus demand unit 14.

The zoom mechanism 10 is controlled by a conventional rate servo, generally din indicated by the reference numeral 16, that is to say a servomechanism, the rate of which may be varied in response to an input signal. The apparatus inside the dotted outline 16 can be regarded as a black box which produces a rate of zoom motion on a shaft 26 which is a function of the voltage at the point 27. It includes a tachogenerator 17, a motor 18 and an amplifier 19 arranged and connected in the usual way.

In operation normal zoom input originating at 28 is controlled by the focus setting is changed by operation of 13 and 14 a zoom rate demand unit 29 set by the operator. When the focus setting is changed by operation of 13 and 14 a tachogenerator 31 driven by the focus mechanism 12 provides a rate proportional electrical signal which is added to the present zoom rate demand signal, if any, from 28. This gives first order compensation so that when the focus mechanism 12 moves, a corresponding movement of the zoom mechanism occurs according to a predetermined law determining the degree of compensation required. This varies throughout the zoom range, of course, but, for this first order compensation, it is chosen to be correct at a point near the wide angle end.

The second embodiment shown in FIG. 2 provides second order compensation of zoom setting for variations in the focus setting. The arrangement is similar to that shown in FIG. 1, but the signal from the focus tachogenerator 31 is attenuated by a potentiometer 32 coupled to the zoom mechanism to give the correct amount of compensation for all zoom settings.

In a further embodiment, shown in FIG. 3 of the drawings, the servo is of the type referred to as position responsive or positional. The positional servo has a zoom position demand element in the form of a potentiometer 50, a zoom position reset element, also a potentiometer 51, a motor 52 and an amplifier 53. The difference between the demanded position and the actual position is determined by an error detecting system interconnecting the outputs of potentiometers 50 and 51. It includes resisters 54 and 55 or any other convenient means and produces a position error signal which is used to control the motor 52.

There is now injected, either into the demand signal or into the error signal, a signal which is dependent on the focus mechanism position produced by a potentiometer 56 coupled to and set by the focus mechanism 12. The tachogenerator 57 is not essential but improves stability and accuracy of the servo. Consequently, if zoom is controlled by a positional servo, the positional demand can be modified to give first order correction by a signal from the c focusing system. This signal varies approximately linearly with movement of the focusing element. While in this embodiment it is described as being obtained from a potentiometer on the focus mechanism, it will be appreciated that if the focus is controlled by a positional servo it could come from the focus demand unit.

Referring to FIG. 4 of the drawings, an embodiment for obtaining second order compensation with a positional zoom servo is substantially the same as that described with reference to FIG. 3, the only difference being an attenuator 58. As with FIG. 2 this also varies the degree of compensation for different positions of the zoom lens.

A further embodiment for a positional zoom servo is shown in FIG. 5 and incorporates an alternative method of achieving compensation. When compared with the embodiments, of FIGS. 3 and 4 described hereinabove, the difference is that the potentiometer 56 has one end earthed, and the other end supplied from two sources. One is a constant positive voltage, the other is dependent on zoom position, and is taken from the zoom position potentiometer. The difference when compared with FIG. 4 is that the potentiometer 56 cannot be used for any other purpose, whereas in FIG. 5 the potentiometer 56 can also be sued for focus indication, for example, or for a focus positional reset.

In some cases it is desirable to combine both rate and positional servo-operation in one zoom lens arrangement, with two modes of operation, one being the rate servomode of operation and the other the positional servomode of operation. Referring now to FIG. 6 of the drawings, the embodiment shown comprises a rate/position switch for selecting either of the two modes of operation. In the rate mode of operation, the arrangement operates as hereinabove described with reference to FIG. 2, but in the positional mode it operates as in FIG. 5, with added rate compensation to give more rapid correction. There is negligible lag because rate correction operates more rapidly.

It will be appreciated that with a servo-operated zoom lens arrangement according to the present invention the lens is automatically readjusted when, for instance, the television camera incorporating it changes to a new scene.

Figure 7:
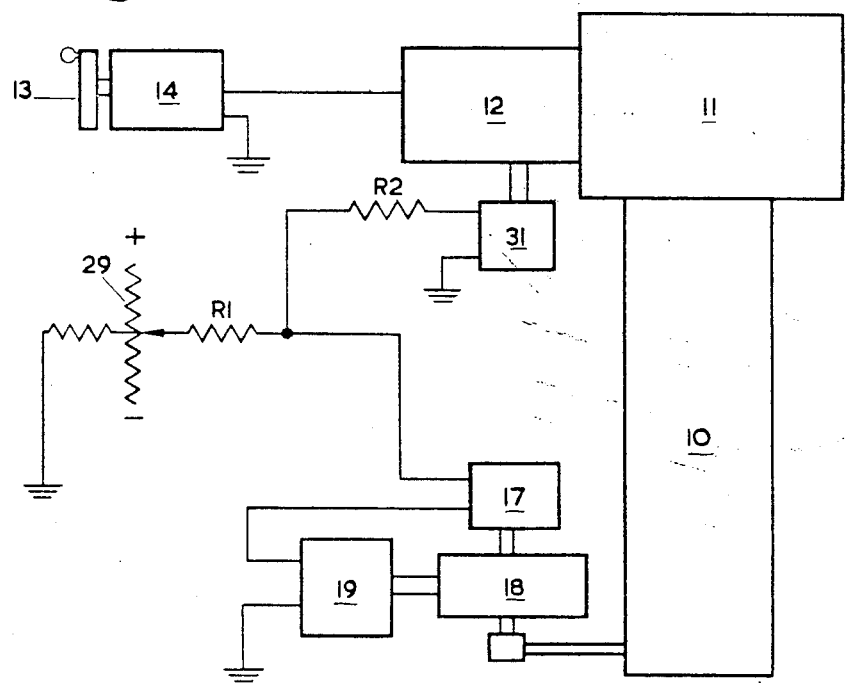

An alternative arrangement of the embodiment of FIG. 1 of the invention is shown in FIG. 7. In the arrangement of this FIG. which provides first order compensation of on zoom rate control, tachogenerator 31 attached to the focus mechanism has one of its terminals earthed, the other terminal being arranged to feed a signal in parallel to the zoom demand signal by way of resistor R2.

Figure 8:
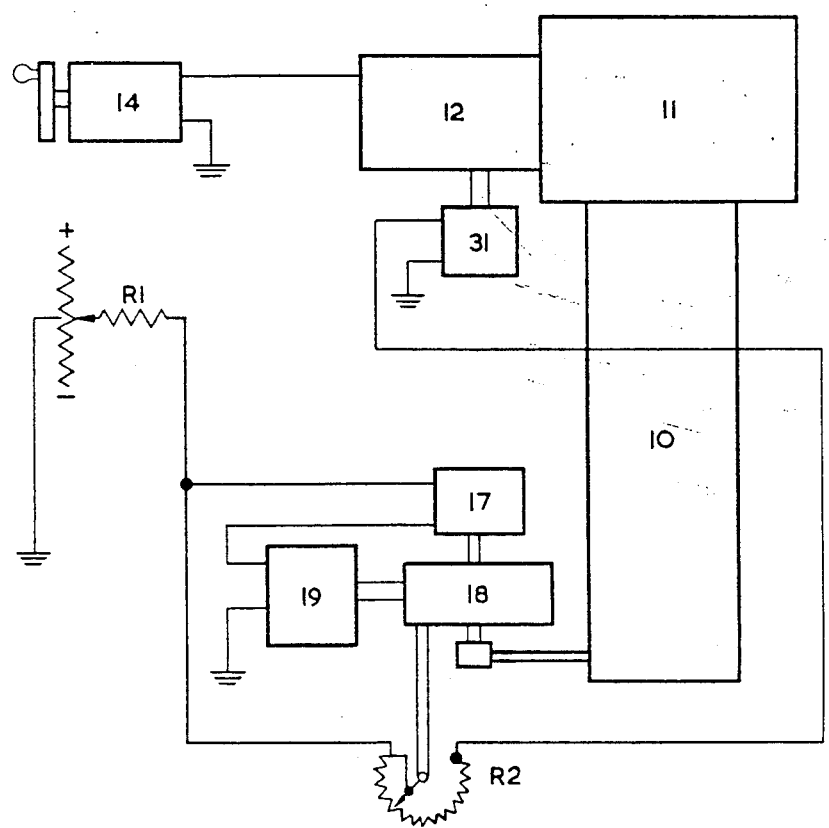

FIG. 8 shows an alternative arrangement of the embodiment of FIG. 2 in which second order compensation is achieved. In this arrangement of FIG. 8, the resistor R2 of FIG. 7 is replaced by a rheostat R2 which is driven by the zoom mechanism. By this means the contribution of the focus tachogenerator 31 can be altered according to the zoom setting, thereby to provide second order correction.

Figure 9:
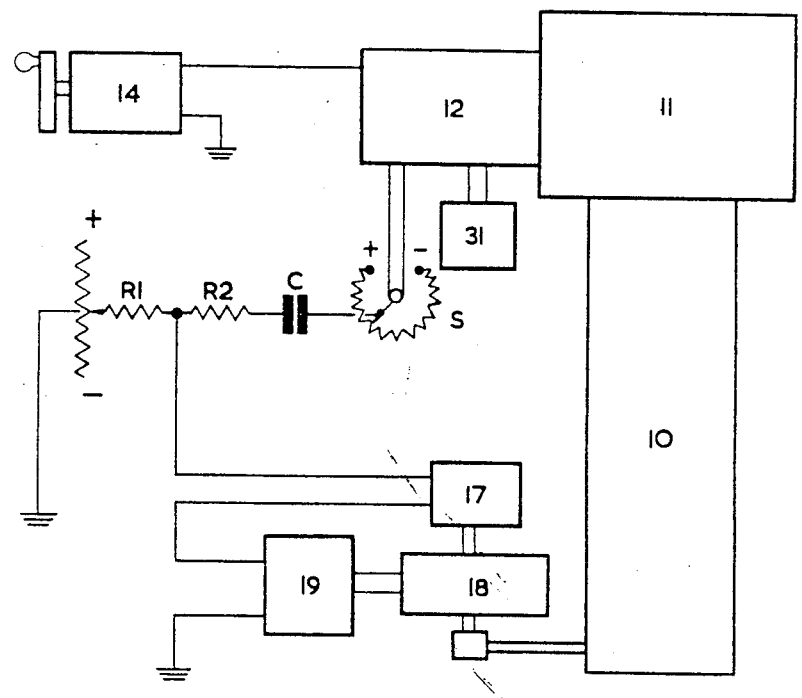
Figure 10:
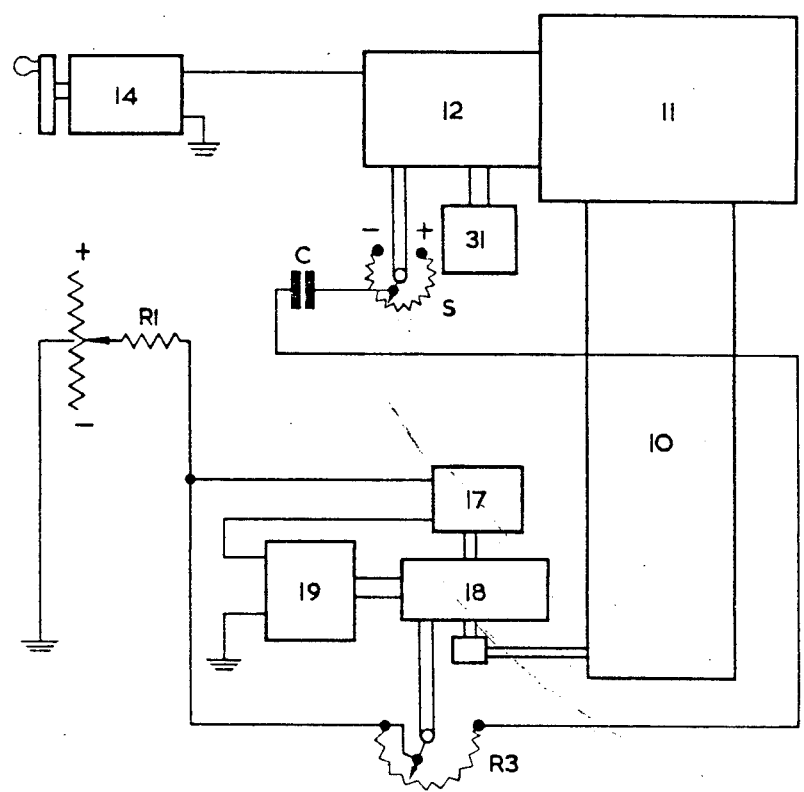

FIGS. 9 and 10 show two further alternative arrangements respectively of the embodiments of FIGS. 1 and 2.

In the arrangement of FIGS. 9 and 10, the tachogenerator (shown to assist description) is replaced by a potentiometer S coupled to and set by the focus mechanism 12 and connected across a DC supply, the focus rate signal being obtained by differentiating the output from the wiper of the potentiometer.

In the arrangement of FIG. 9 which is effective to produce first order compensation, this differentiated signal from capacitor C is applied by way of resistor R2 to the zoom rate system and in parallel with the zoom rate signal. The time constant and peak value of the focus rate signal can be adjusted by altering the value of the resistors R1 and R2 to give sufficient and rapid compensation as soon as the focus is driven. The arrangement can be such as to operate with R2 being zero. Since the resistors R1 and R2 are fixed, however, first order compensation only can be achieved with this arrangement.

Second order compensation can, however, be achieved in the arrangement of FIG. 10, in which the fixed resistor R2 of FIG. 9 is replaced by a rheostat R3 driven from the focus mechanism.

Figure 11:
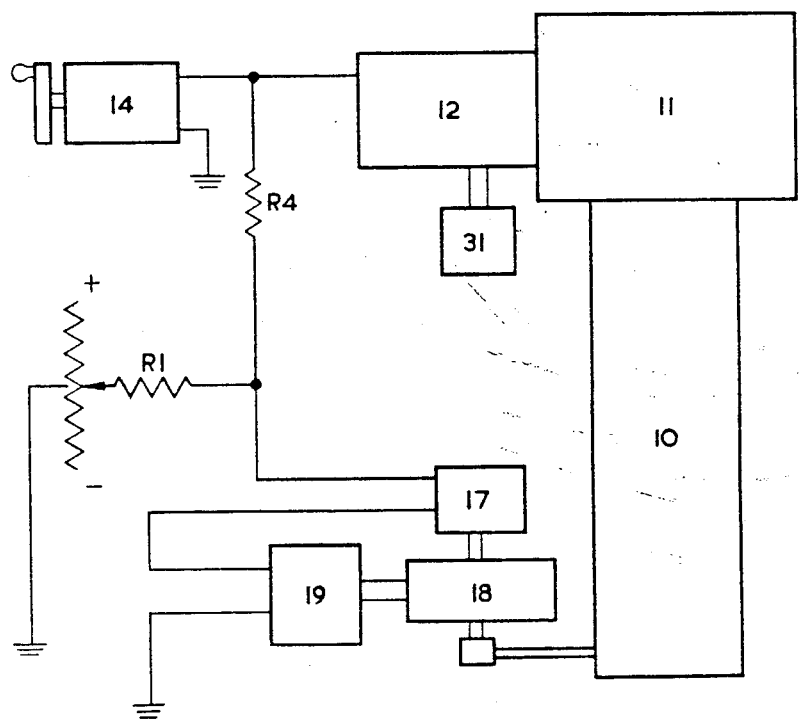
Figure 12:
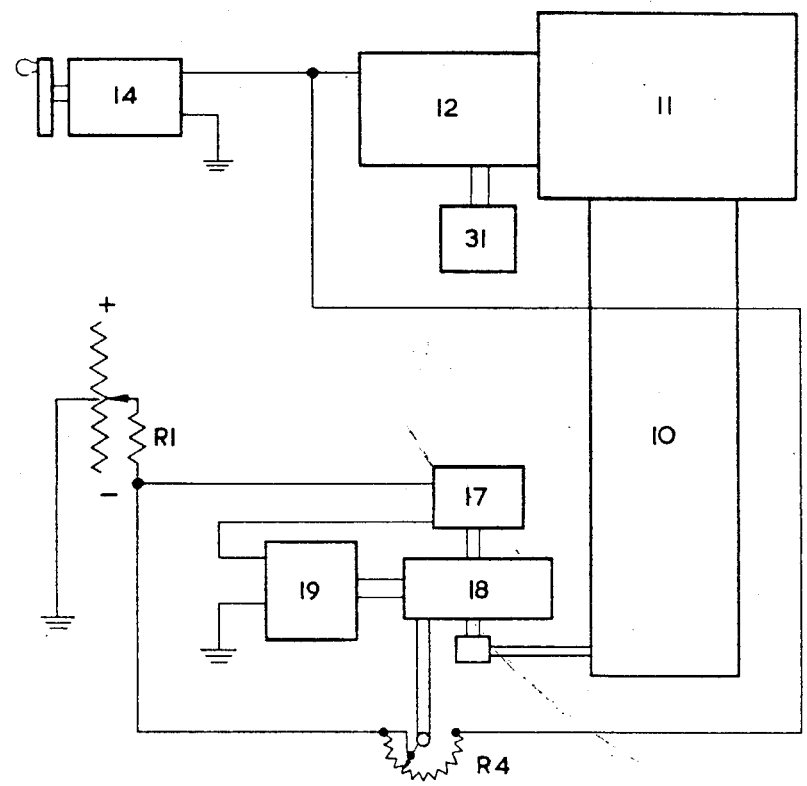

FIGS. 11 and 12 respectively show further alternative arrangements of the embodiments of FIGS. 7 and 8 in which when a hand driven tachometer generator only is used as the demand unit for the focus mechanism 12 first and second order compensation on rate control is obtained by taking a modified signal from the hand driven tachometer generator and injecting this modified signal into the zoom rate error signal.

In FIG. 11 this signal from the hand driven tachometer generator is modified by a fixed resistor R4 to provide first order compensation and in FIG. 12 the fixed resistor R4 is replaced by a rheostat R4, the wiper of which is driven from the zoom mechanism. The signal is thus modified in the rheostat R4 to provide second order compensation.

In these embodiments it is possible to derive a focusing rate signal signal when on position control of focus by differentiating the signal taken from the demand potentiometer and applying it to the zoom system; in this case the time constant of the high pass filter provided by such an arrangement is adjusted as before to give sufficient and rapid compensation on adjustment of the focus demand potentiometer.

Figure 13:
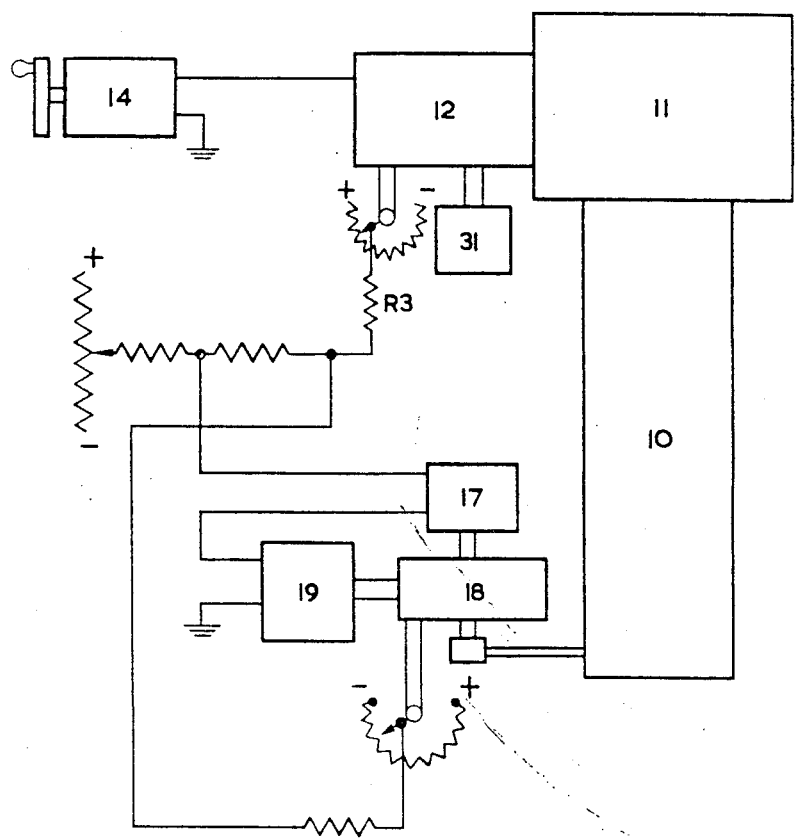
Figure 14:
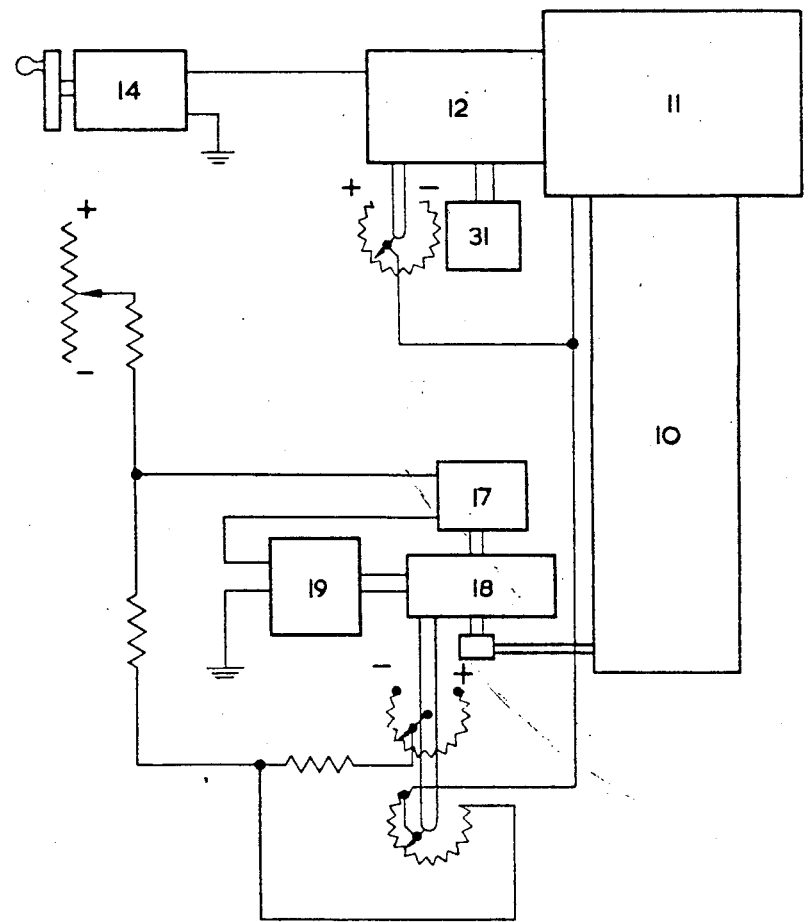

Referring now to FIGS. 13 and 14, these FIGS. show how first and second order compensation can be achieved when on positional control of zoom, by injecting into the zoom error signal, a further signal obtained from the wiper of a potentiometer driven by the focus mechanism. It has already been mentioned similar compensation can be obtained by injecting this focus positional signal into the zoom position demand instead of an error signal. Also, the focus positional signal can be derived from the focus demand potentiometer when using a focus position servo.

However, similar compensation can be also be achieved by compensating the zoom position reset signal with the focus positional signal as shown in FIGS. 13 and 14 which respectively show arrangements for providing first order and second order compensation.

Thus, FIG. 13 shows an arrangement for producing this type of compensation in which the reset resistor of the zoom position servo is divided and the focus position signal is fed over resistor R3 into the zoom reset path in order to provide first order correction.

FIG. 14 shows a similar arrangement providing second order correction by replacing the fixed resistor R3 of FIG. 13 with a rheostat R3 which is driven from the zoom servomechanism.

Figure 15:
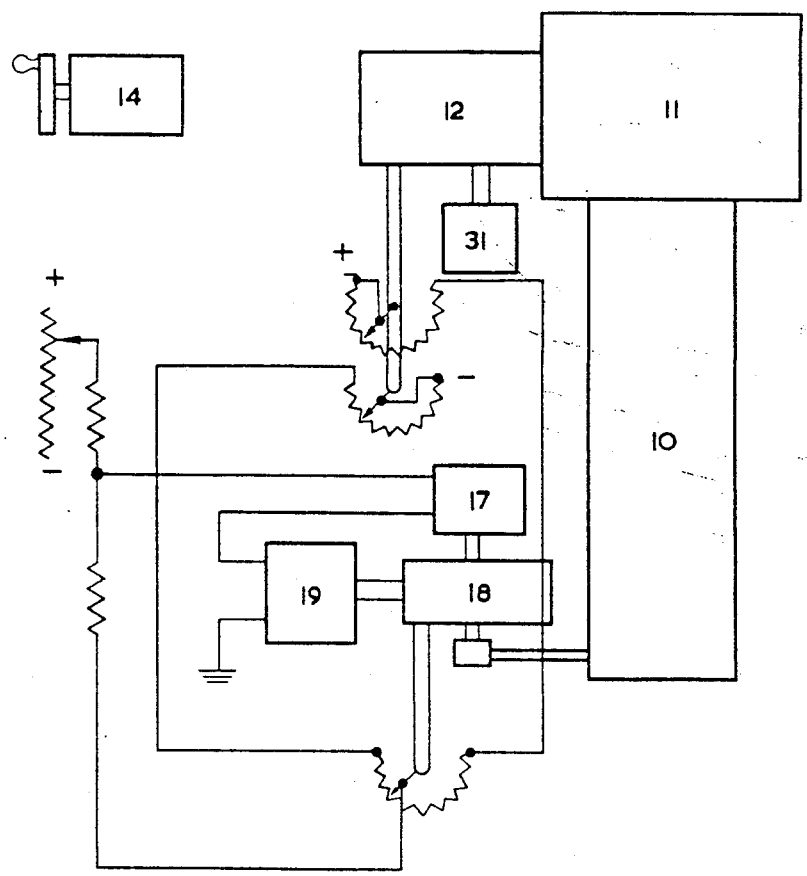
Figure 16:
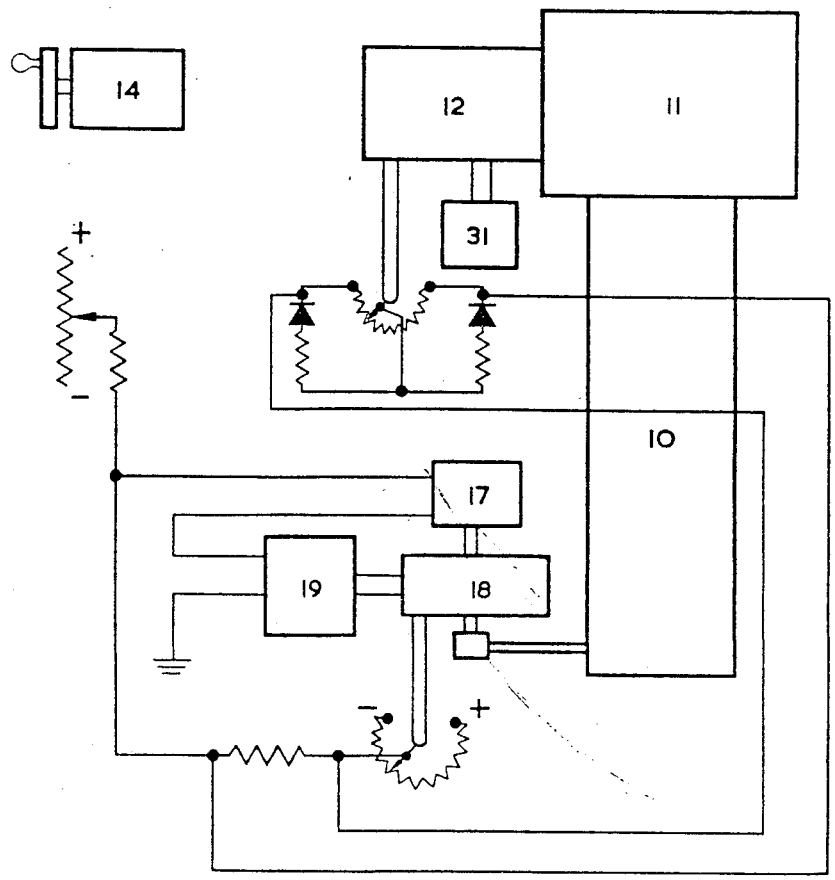

Two further methods of obtaining compensation when on position control of zoom are shown in FIGS. 15 and 16 respectively The arrangement of FIG. 15 incorporates the use of two rheostats placed in series with the reset potentiometer on the zoom system, both, rheostats being driven from the focus mechanism. This arrangement provides first of order compensation where the correction is constant throughout the zoom range.

In the arrangement of FIG. 16 which provides second order compensation a potentiometer is connected across the reset resistor of the zoom positional servo, the potentiometer being driven from the focus mechanism with its wiper being connected to both end terminals via diodes and resistors.

We claim:

1. A servo-controlled zoom lens arrangement comprising a zoom mechanism determining zoom see setting including servo-driven means coupled to actuate the zoom mechanism to change zoom setting according to an electric signal at the zoom control servo, a focus mechanism determining focus setting, electric signal generating means coupled to the focus mechanism to provide a magnification compensation signal in response to any change of focus setting, and means applying said magnification compensation signal combined with the zoom demand signal, if any, to the zoom control servo to correctively vary the zoom setting according to such change of focus setting the means for applying including electric signal modification means coupled to the zoom mechanism to variably modify the incident signal according to zoom setting thereby providing a second order of magnification compensation.

2. An arrangement according to claim 1, wherein the zoom control servo is position-responsive in that the zoom demand signal is an error signal representative of the difference between a signal from a positional zoom demand unit in the arrangement and a signal representing present zoom setting from a positional reset unit coupled to the zoom mechanism, and the generating means includes signal magnitude determining variable resistance means coupled to and set by the focus mechanism in accordance with focus setting.

3. An arrangement according to claim 2, wherein the variable resistance means comprises a pair of rheostats both coupled to and set by the focus mechanism in accordance with focus setting, the rheostats being connected in series one on each side of a potentiometer in the reset unit which potentiometer is coupled to and set by the zoom mechanism in accordance with zoom setting.

4. An arrangement according to claim 2, wherein the variable resistance means comprises a potentiometer supplying said compensation signal.

5. An arrangement according to claim 4, wherein the potentiometer is connected across a resistor from which the output of the reset unit is taken and the potentiometer wiper is connected to each end of the potentiometer by a diode poled towards that end.

6. An arrangement according to claim 4, wherein one end of the potentiometer is earthed.

7. An arrangement according to claim 4, wherein said means for applying includes means connecting the output of the potentiometer to a circuit path for said error signal.

8. An arrangement according to claim 4, wherein said means for applying includes means connecting the output of the potentiometer to the output of said zoom demand unit.

9. An arrangement according to claim 4, wherein said means for applying includes means connecting the output of the potentiometer to the output of said reset unit.

10. An arrangement according to claim 9, wherein the said means connecting includes a rheostat coupled to the zoom mechanism to set the portion traversed by the output of the potentiometer to provide a second order of magnification compensation.

11 An arrangement according to claim 4, further comprising means connecting the output of the potentiometer to electric signal modifying means coupled to the zoom mechanism to variably modify an incident signal according to zoom setting thereby providing a second order of magnification compensation.

12. An arrangement according to claim 11, wherein the modifying means includes a resistive attenuator of which the portion traversed by the output of the generating means is set by the zoom mechanism in accordance with zoom setting, the output of the potentiometer constituting the second order compensation signal.

13. An arrangement according to claim 1, wherein the zoom control servo is rate-responsive, and the generating means comprises a tachogenerator driven by the focus mechanism.

14. An arrangement according to claim 13, wherein one output terminal of the tachogenerator is earthed, the compensation signal being taken from the other terminal over a resistance.

15. An arrangement according to claim 14, wherein the resistance comprises a variable portion of a rheostat coupled to and set by the zoom mechanism in accordance with zoom setting to provide a second order of magnification compensation.

16. An arrangement according to claim 13, further comprising means connecting the output of the tachogenerator to electric signal modifying means coupled to the zoom mechanism to variably modify an incident signal in accordance with zoom setting to provide a second order of magnification compensation in the output of the tachogenerator.

17. An arrangement according to claim 16, wherein the modifying means includes a potentiometer traversed by the output of the tachogenerator, and set by the zoom mechanism in accordance with zoom setting.

18. An arrangement according to claim 17, wherein the zoom control servo is also capable of position-responsive operation; and further comprising additional electric signal generating means including a potentiometer coupled to and set by the focus mechanism in accordance with focus setting, means for applying the output of the latter potentiometer to adjust a positional zoom demand signal, and switch means for replacing the output of a rate zoom demand unit by the adjusted positional zoom demand signal.

19. An arrangement according to claim 1, wherein the zoom control servo is rate-responsive, and the generating means includes a potentiometer coupled to to and set by the focus mechanism in accordance with focus setting, and a differentiating circuit connected to the output of the potentiometer to provide said magnification compensation signal.

An arrangement according to claim 19, further comprising means connecting the output of output of differentiating circuit to electric signal modifying means including a rheostat coupled to and set by the zoom mechanism in accordance with zoom setting to provide a second order of magnification compensation in the output of the differentiating circuit.

21. A servo-operated zoom lens arrangement comprising a zoom mechanism determining zoom setting, servo driven means coupled to actuate the zoom mechanism according to an electric signal at the zoom control servo, a focus mechanism determining focus setting, and driven tachogenerator in focus demand means for actuating the focus mechanism to vary focus setting and means for applying the output of the tachogenerator to the zoom control servo as a magnification compensation signal to correctively vary the zoom setting according to any change of focus setting.

22. An arrangement according to claim 21, wherein said means for applying includes a rheostat coupled to and set by the zoom mechanism in accordance with zoom setting to provide a second order of magnification compensation in the output of the tachogenerator.